Patented Apr. 27, 1948

2,440,359

UNITED STATES PATENT OFFICE 2,440,359

PROCESS AND CULTURE MEDIA FOR PRODUCING PENICILLIN

Otto K. Behrens, Reuben G. Jones, and Joseph W. Corse, Indianapolis, Ind., assignors to Eli Lilly and Company, Indianapolis, Ind., a corporation of Indiana No Drawing. Application August 24, 1945, Serial No. 612,538

8 Claims. (Cl. 195—36)

This invention relates to penicillin and more particularly to improvements in the production thereof.

An object of this invention is to provide a process whereby the production and yield of penicillin may be improved. Other objects will be apparent from the disclosures herein made.

Penicillin, a material produced by a Penicillium mold of the notatum-chrysogenum group, has become widely known within recent years for its remarkable therapeutic properties as an antibacterial agent.

The availability of penicillin has been retarded by the circumstances of its production. The penicillin formed, presumably as a metabolic product, by the growth of the mold under suitable conditions, has been produced slowly and in very small quantity. Furthermore, the mold has produced other products chemically similar to penicillin, but without potent antibacterial properties. Thus the small quantity of penicillin and the presence of structurally similar compounds has rendered its isolation difficult.

One of the methods which has been employed commercially for the production of penicillin is that known as surface culture. In a common adaptation of this method a liquid nutrient medium is supplied to a large number of bottles which are supported in a substantially horizontal position. The nutrient medium is then inoculated with the Penicillium mold and the mold grows on the surface of the nutrient medium. In order to produce commercial quantities of penicillin by this method a large number of bottles is required and individual handling is necessary.

Another process which has been commercialized to some extent is that known as the bran process wherein Penicillium mold is grown on bran. The bran may be spread in thin layers on trays or may be agitated continuously in rotating drums. While the bran itself is a nutrient for the growth of the mold, it is common to associate additional nutrient materials therewith.

Probably the most widely used process at the present time for the production of penicillin is that ordinarily referred to as submerged or deep culture. The submerged culture process involves the growth of Penicillium mold in an aqueous nutrient medium and accompanied customarily by agitation. When the submerged culture process is carried out in small vessels such as flasks of relatively small capacity, the process is frequently referred to as the "shake" culture process because the agitation is brought about by continuously shaking the culture by suitable mechanical means. When containers of larger capacity are employed, and such containers may have capacities running into the thousands of gallons, the agitation of the liquid nutrient medium is ordinarily accomplished in part by mechanical stirring and in part by aeration, which latter functions primarily to supply oxygen for the growth of the mold.

All of the above processes have been characterized in general by the slow production, and low yield, of penicillin.

By our invention the production of penicillin by a Penicillium mold of the notatum-chrysogenum group may be accelerated and the yield of penicillin increased.

According to the present invention penicillin is produced by growing a Penicillium mold of the notatum-chrysogenum group in a culture medium in the presence of a compound represented by the general formula

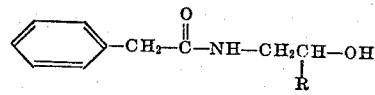

wherein R represents a member of the class consisting of hydrogen, methyl and ethyl. According to a preferred method, Penicillium mold and one or more of the phenylacetyl compounds as described above are associated with an aqueous culture medium containing nutrient material suitable for the growth and development of the mold, and the mold is grown under penicillin-producing conditions. The phenylacetyl compound of the group described above is incorporated in the nutrient material in effective amount less than about 1 percent. and preferably less than about 0.3 percent. The amount of material which accelerates the production of penicillin may accordingly be present in relatively small amount although over a substantial range. For example, the method has been effectively carried out by associating about 0.015 percent of N-(2-hydroxyethyl)-phenylacetamide and the Penicillium mold with a culture medium containing mold-growth-supporting material.

In another aspect there is provided by this invention a culture medium comprising mold-growth-supporting material and a phenylacetyl compound as set forth in the next preceding paragraph. In a preferred form the culture medium may comprise water, mold-growth-supporting material, and, in amount effective to accelerate the production of penicillin and less than about 1 percent and preferably less than about 0.3 percent, a compound as described above. The amount of the compound which accelerates the production of penicillin may vary substantially throughout the range indicated above. By way of example, the culture medium may contain about 0.015 percent of N-(2-hydroxyethyl)-phenylacetamide.

The phenylacetyl compounds employed in this invention are novel per se and are disclosed in detail and claimed in copending application Serial No. 612,536, filed August 24, 1945. This invention will now be described in detail in its present preferred application to the submerged culture process of producing penicillin.

In the submerged culture process, the culture medium comprises water and mold-growth-supporting material. The mold-growth-supporting material is nutrient material and may consist of ingredients known to those skilled in the art. A prominent constituent of one type of suitable nutrient is that known as corn steep solids which is a by-product obtained in the manufacture of corn starch. Corn steep solids is a desirable material because of its low cost and its effectiveness in bringing about a relatively high yield of penicillin. On the other hand corn steep solids is of indeterminate chemical composition, some ingredients of which may make more difficult the isolation of the penicillin produced during the growth of the mold. With a major constituent such as corn steep solids there are ordinarily associated additional ingredients known to the art such as corn sugar, lactose, and salts such as calcium carbonate and zinc sulfate. The exact function of the various ingredients is not known in detail, but it is known to those skilled in the art that the combination of such ingredients does bring about the production of penicillin when a Penicillium mold of the notatum-chrysogenum group is grown in such a culture medium under suitable conditions.

Another type of aqueous culture medium includes water and nutrient substances which, as contrasted with corn steep solids, are of a determinate chemical composition. Such ingredients include lactose, dextrose, acetic acid and salts such as sodium nitrate, ammonium nitrate, potassium dihydrogen phosphate, and magnesium sulfate. Compositions of this type are advantageous in that penicillin frequently is more readily separated from the other constituents of the culture medium and other products of the growth of the mold.

The mold employed for the production of penicillin is a Penicillium mold of the notatum-chrysogenum group, and illustratively a strain of this mold suitable for the purposes of this invention is that known as strain N. R. R. L. 1976.

As examples of compounds which may be employed for the purposes of this invention to accelerate the production of penicillin and which come within the scope of the structural formula given above may be mentioned N-(2-hydroxyethyl) - phenylacetamide, N-(2-hydroxypropyl) - phenylacetamide, and N - (2 - hydroxybutyl) - phenylacetamide.

The amounts of the phenylacetyl compounds employed in carrying out this invention may vary to a substantial extent. In general the effective amount of the phenylacetyl compound ranges up to about 10 g. per liter of culture medium or in other words about 1 percent on a weight-volume basis, although generally it is preferred to employ the phenylacetyl compound in amounts less than about 0.3 percent. The present optimum range is about 0.015 to 0.02 percent and in general there is no particular advantage to be gained by employing amounts of the phenylacetyl compounds in substantial excess of the amount effective in promoting the production of pencillin by the mold.

The phenylacetyl compound may be associated with the mold and culture medium at any suitable time. Thus the materials of the culture medium upon association in a suitable container may be inoculated with the Penicillium mold, and the phenylacetyl compound may be incorporated either before or shortly after the inoculation with the mold.

The culture medium, with the mold, and the compound accelerating the production of penicillin, should be maintained at a suitable temperature, for example in the range of 20–30° C. A range of temperature which has been found to be particularly suitable is from 24–28° C. The period of time during which the mold is grown will depend upon the objective desired. Thus the mold may be grown only during the period of its maximum rate of growth. Under such conditions the mold growth may be interrupted after a period of growth of from two to three days. On the other hand the mold may be grown to obtain the maximum yield of penicillin. In such case the mold may be grown for a longer period, for example for about four or five days.

The penicillin may be separated from the culture medium in any suitable manner. For example the penicillin may be adsorbed on a surface-active carbon. Alternatively the penicillin may be extracted by means of a suitable water-immiscible organic solvent such as amyl acetate. By well-known extractive procedures, the penicillin subsequently may be isolated in dry form as a salt thereof, for example the sodium or calcium salt.

By the practice of this invention the yield of pencillin has been substantially increased. Thus under comparative conditions the yield of penicillin has been increased from 30 to upwards of 80 percent. This range is of course illustrative and lesser or greater yields are within the contemplation of the invention depending upon the conditions under which the penicillin is produced.

Specific examples further illustrating the invention particularly with respect to the deep culture process of producing penicillin are given below.

*Example 1*

A culture medium was prepared comprising the following constituents:

| | | |
|---|---|---|
| Corn steep solids | pounds | 500 |
| Corn sugar | do | 125 |
| Lactose | do | 500 |
| Calcium carbonate | do | 50 |
| Water | gallons | 3,000 |

To the above culture medium were added about three pounds of N-(2-hydroxethyl)-phenylacetamide equivalent on a weight-volume basis to 0.015 percent. The culture medium was inoculated with a Penicillium mold, strain N. R. R. L. 1976, and the mold was allowed to grow for 4 days at 27° C. The penicillin produced in the above culture medium amounted to 141 Oxford units per cc. of culture medium.

By way of comparison, a Penicillium mold of the same strain grown in the same culture medium under the same conditions including time and temperature as above except in the absence of the N-(2-hydroxyethyl)-phenylacetamide, produced penicillin to the extent of only 70 Oxford units per cc. of culture medium.

From the above it will be seen that an increase in production of penicillin to the extent of 102 percent was accomplished in carrying out the production of penicillin in accordance with this invention.

*Example 2*

A culture medium was prepared as follows:

| | |
|---|---|
| Lactose _____grams__ | 35 |
| Corn steep solids_____do____ | 20 |
| Calcium carbonate_____do____ | 2 |
| Zinc sulfate heptahydrate_____do____ | 0.004 |
| M/50 phosphate buffer_____cc__ | 5 |
| Water, q. s._____do____ | 1,000 |

0.14 g. of N-(2-hydroxyethyl)-phenylacetamide, namely 0.014 percent on a weight-volume basis, were added to the culture medium and the medium was inoculated with a Penicillium mold, strain N. R. R. L. 1976. The culture medium and mold were agitated continuously and the mold was permitted to grow for four days at 27° C. There was obtained penicillin to the extent of 158 Oxford units per cc. of culture medium.

By way of comparison, when the Penicillium mold was grown under the same conditions but in the absence of the N-(2-hydroxyethyl)-phenylacetamide the yield of penicillin was 104 Oxford units per cc. of culture medium.

*Example 3*

In the same culture medium and under growth conditions the same as those described in Example 2, 1.0 g. of N-(2-hydroxyethyl)-phenylacetamide, namely 0.1 percent on a weight-volume basis produced a concentration of penicillin of 157 Oxford units per cc. of culture medium, which was an increase of 51 percent over the amount of penicillin, namely 104 Oxford units produced when no N-(2-hydroxyethyl)-phenylacetamide was employed.

*Example 4*

In the same culture medium and under growth conditions the same as those described in Example 2, 0.1 g. of N-(2-hydroxyethyl)-phenylacetamide, namely 0.01 percent on a weight-volume basis, produced penicillin to the extent of 166 Oxford units per cc. of culture medium. This represented an increase of 43 percent over the 116 Oxford units of penicillin produced under the same conditions except in the absence of N-(2-hydroxyethyl)-phenylacetamide.

*Example 5*

In the same culture medium and under growth conditions the same as those described in Example 2, 2.0 g. of N-(2-hydroxyethyl)-phenylacetamide, namely 0.2 percent on a weight-volume basis, produced penicillin to the extent of 175 Oxford units per cc. of culture medium as compared with a penicillin concentration of 116 Oxford units per cc. of culture medium produced in the absence of N-(2-hydroxyethyl)-phenylacetamide.

*Example 6*

In the same culture medium and under growth conditions the same as those described in Example 2, 0.016 percent on a weight-volume basis of N-(2-hydroxypropyl)-phenylacetamide produced penicillin to the extent of 157 Oxford units per cc. of culture medium as compared with a penicillin concentration of 129 Oxford units per cc. of culture medium obtained when no N-(2-hydroxypropyl)-phenylacetamide was employed.

*Example 7*

In the same culture medium and under growth conditions the same as those described in Example 2, 0.016 percent on a weight-volume basis of N-(2-hydroxybutyl)-phenylacetamide produced a penicillin concentration of 114 Oxford units per cc. of culture medium as compared with a penicillin concentration of 105 Oxford units per cc. of culture medium obtained when no N-(2-hydroxybutyl)-phenylacetamide was employed.

In the above examples "corn steep solids" has been included as a constituent of the culture medium. Corn steep solids assists in the obtaining of high yields of penicillin, but due in part to the heterogeneous nature of corn steep solids difficulty is involved in the separation of penicillin from other constituents of the culture medium following the growth of the mold.

In the examples to follow the culture media do not contain corn steep solids and are of more precise chemical composition. The employment of such culture media may result in the production of a lower yield of penicillin. On the other hand, penicillin which is produced may be considerably more readily separated from the culture media following the growth of the mold.

*Example 8*

A culture medium not embodying corn steep solids is as follows:

| | |
|---|---|
| Water _____cubic centimeters__ | 1,000 |
| Lactose _____grams__ | 25.0 |
| Dextrose _____do____ | 5.0 |
| Sodium nitrate _____do____ | 5.0 |
| Ammonium nitrate _____do____ | 5.0 |
| Potassium dihydrogen phosphate __do____ | 1.0 |
| Magnesium sulfate _____do____ | 0.25 |
| Acetic acid _____do____ | 5.0 |
| Zinc sulfate heptahydrate _____do____ | 0.04 |
| Calcium sulfate heptahydrate _____do____ | 0.005 |
| Ferrous sulfate heptahydrate _____do____ | 0.2 |

0.14 g. of N-(2-hydroxyethyl)-phenylacetamide, namely 0.014 percent on a weight-volume basis were added for the purposes of this invention and the culture medium inoculated with Penicillium mold strain N. R. R. L. 1976. The mixture was mechanically agitated and maintained at a temperature of about 27° C. for six days. At this time the penicillin had been produced to the extent of about 87 Oxford units per cc. of culture medium.

By way of comparison, a medium containing no N-(2-hydroxyethyl)-phenlyacetamide but otherwise the same and maintained under the same conditions for six days produced penicillin to the extent of a concentration of only 54 Oxford units per cc. of culture medium.

*Example 9*

Another example of a culture medium not embodying corn steep solids is as follows:

| | |
|---|---|
| Potassium dihydrogen phosphate__grams__ | 1.0 |
| Dipotassium hydrogen phosphate___do____ | 1.0 |
| Magnesium sulfate heptahydrate___do____ | 1.0 |
| Sodium nitrate_____do____ | 2.0 |
| Lactose _____do____ | 10.0 |
| Zinc sulfate heptahydrate_____do____ | 0.01 |
| Water, q. s. _____cc__ | 2,000 |

(Adjusted to pH 6.5 with NaOH solution)

N-(2-hydroxyethyl)-phenlyacetamide was incorporated in the above culture medium to the extent of about 0.014 percent and the medium inoculated with the N. R. R. L. 1976 strain of Penicillium mold. The composition was mechanically agitated for three days and maintained at a temperature of about 27° C. The penicillin was then found to be present to the extent of 30 Oxford units per cc. of culture medium.

By way of comparison, under the same conditions except for the absence of N-(2-hydroxyethyl)-phenlyacetamide the penicillin production was only 20 Oxford units per cc. of culture medium.

*Example 10*

In a culture medium as described in the table in Example 9 there was incorporated 0.015 percent of N-(2-hydroxypropyl)-phenylacetamide and the culture medium was inoculated with Penicillium mold strain N. R. R. L. 1976. The mixture was mechanically agitated and maintained at a temperature of about 27° C. for six days. Penicillin was produced to the extent of about 31 Oxford units per cc. of culture medium.

By way of comparison, under the same conditions except for the absence of N-(2-hydroxypropyl)-phenylacetamide penicillin was produced to the extent of only 21 Oxford units per cc. of culture medium.

As previously mentioned the compounds to be employed in carrying out this invention are novel and their preparation is disclosed in copending application Serial No. 612,536, filed August 24, 1945. For purposes of convenience, suitable methods of preparation of some of these compounds are illustrated below.

*Preparation of N-(2-hydroxyethyl)-phenylacetamide*

A mixture of 328 g. of ethyl phenylacetate and 132 g. of ethanolamine is heated at 150° C. until no more ethyl alcohol distills from the reaction mixture. The time required for this heating is about two hours, and during the heating about 115 cc. of ethyl alcohol distills from the reaction mixture. The excess ethanolamine remaining in the reaction mixture is substantially completely removed by subjecting the reaction mixture to a vacuum, preferably below 20 mm. of pressure, while maintaining the reaction mixture at a temperature of about 140–150° C. The residue comprising crude N-(2-hydroxyethyl)-phenylacetamide is purified by dissolving it in ethyl alcohol and precipitating it from solution by the addition of ether. Purified N-(2-hydroxyethyl)-phenylacetamide has been found to melt at about 61–62° C., and analysis has shown the presence of 7.70 percent nitrogen as compared with a calculated value of 7.82 percent.

*Preparation of N-(2-hydroxybutyl)-phenylacetamide*

16.4 g. of ethyl phenylacetate and 8.9 g. of 2-hydroxybutylamine are heated at about 125° C. for 15 hours. The reaction mixture is then cooled and dissolved in about 50 cc. of absolute alcohol. Upon the addition of about 2 volumes of ether to the solution, N-(2-hydroxybutyl)-phenylacetamide is obtained as an oil which slowly crystallizes upon standing. The compound is purified by redissolving the crystalline material in alcohol and reprecipitation with ether. The product thus obtained melts at about 57–59° C. An analysis has shown the presence of 6.8 percent nitrogen as compared with a calculated value of 6.75 percent.

*Preparation of N-(2-hydroxypropyl)-phenylacetamide*

N-(2-hydroxypropyl)-phenylacetamide may be prepared in the same manner as the N-(2-hydroxybutyl)-phenylacetamide described above was prepared. N-(2-hydroxypropyl)-phenylacetamide has been found to melt at 80–81° C. and an analysis has shown the presence of 7.20 percent nitrogen as compared with a calculated value of 7.25 percent.

What is claimed is:

1. The improved method of producing penicillin in submerged culture which comprises providing a culture medium containing nutrient material and associating with said culture medium a Penicillium mold of the notatum-chrysogenum group and an effective amount less than about 1 percent of N-(2-hydroxypropyl)-phenylacetamide.

2. A culture medium for the production of penicillin in submerged culture through the growth of a Penicillium mold of the notatum-chrysogenum group, said culture medium comprising water, nutrient material dispersed in said water, and containing an effective amount less than about 1 percent of N-(2-hydroxypropyl)-phenylacetamide.

3. The method of producing penicillin in submerged culture which comprises growing a Penicillium mold of the notatum-chrysogenum group in a culture medium in the presence of an effective amount less than about one percent of a compound of the group consisting of N-(2-hydroxyethyl)-phenylacetamide, N-(2-hydroxypropyl)-phenylacetamide, and N-(2-hydroxybutyl)-phenylacetamide.

4. The improved method of obtaining penicillin in submerged culture which comprises providing an aqueous culture medium for the growth and development of a Penicillium mold of the notatum-chrysogenum group, associating with said culture medium a Penicillium mold of the notatum-chrysogenum group, and an effective amount less than about one percent of a compound of the group consisting of N-(2-hydroxyethyl)-phenylacetamide, N-(2-hydroxypropyl)-phenylacetamide and N-(2-hydroxybutyl)-phenylacetamide.

5. In the method of producing penicillin in submerged culture, by growing a Penicillium mold of the notatum-chrysogenum group in association with a nutrient material, the improvement which comprises incorporating in the nutrient material an effective amount less than about one percent of a compound of the group consisting of N-(2-hydroxyethyl)-phenylacetamide, N-(2-hydroxypropyl)-phenylacetamide and N-(2-hydroxybutyl)-phenylacetamide.

6. A culture medium for the production of penicillin in submerged culture through the growth of a Penicillium mold of the notatum-chrysogenum group, said culture medium comprising water, nutrient material dispersed in said water and an effective amount less than about one percent of a compound of the group consisting of N-(2-hydroxyethyl)-phenylacetamide, N-(2-hydroxylpropyl)-phenylacetamide and N-(2-hydroxybutyl)-phenylacetamide.

7. The improved method of producing penicillin in submerged culture which comprises providing a culture medium containing a nutrient material, and associating with said culture medium a Penicillium mold of the notatum-chrysogenum group and an effective amount less than about one percent of N-(2-hydroxyethyl)-phenylacetamide.

8. A culture medium for the production of penicillin in submerged culture through the growth of a Penicillium mold of the notatum-chrysogenum group, said culture medium comprising water, nutrient material dispersed in said water, and containing an effective amount less than about one percent of N-(2-hydroxyethyl)-phenylacetamide.

OTTO K. BEHRENS.
REUBEN G. JONES.
JOSEPH W. CORSE.

REFERENCES CITED

The following references are of record in the file of this patent:

Coghill, Monthly Progress Report No. 16, November 20, 1943. Distributed by Committee on Medical Research, O. S. R. D., pages 1 and 2.

Pennsylvania State College, Penicillin Interim Report (45–124), March 30, 1945, page 1.